US008931980B2

(12) United States Patent
Knecht

(10) Patent No.: US 8,931,980 B2
(45) Date of Patent: Jan. 13, 2015

(54) TAP AND DIE DEVICES

(76) Inventor: Ken Knecht, Chugiak, AK (US)

(*) Notice: Subject to any disclaimer, the term of this patent is extended or adjusted under 35 U.S.C. 154(b) by 968 days.

(21) Appl. No.: 13/021,152

(22) Filed: Feb. 4, 2011

(65) Prior Publication Data

US 2012/0201617 A1 Aug. 9, 2012

(51) Int. Cl.
| B23B 49/02 | (2006.01) |
|---|---|
| B23G 5/06 | (2006.01) |
| B23G 9/00 | (2006.01) |
| B23G 5/04 | (2006.01) |

(52) U.S. Cl.
CPC ............... B23G 9/009 (2013.01); B23G 5/043 (2013.01); B23G 5/062 (2013.01)
USPC ...... 408/1 R; 408/115 R; 408/72 B; 408/222; 470/198

(58) Field of Classification Search
CPC .......... B23G 5/062; B23G 5/06; B23G 9/009; B23G 2200/42; B23G 2240/20
USPC .......... 408/221, 222, 84, 72 B, 115 R, 115 B, 408/110, 238, 97, 215, 1 R; 470/198, 96, 98
See application file for complete search history.

(56) References Cited

U.S. PATENT DOCUMENTS

| 1,316,201 | A | * | 9/1919 | Tacke | 408/82 |
| 2,757,393 | A | * | 8/1956 | Galloway | 408/201 |
| 2,787,010 | A | * | 4/1957 | Uphoff | 408/204 |
| 3,907,452 | A | * | 9/1975 | Tripp | 408/56 |
| 5,108,241 | A | * | 4/1992 | Coss | 408/72 B |
| 5,630,683 | A | * | 5/1997 | Smith | 408/67 |
| 5,733,199 | A | * | 3/1998 | Capri | 470/98 |
| 5,758,996 | A | * | 6/1998 | Loudon | 408/72 B |
| 6,293,740 | B1 | * | 9/2001 | Schulte | 409/66 |

FOREIGN PATENT DOCUMENTS

| FR | 1068255 | A | * | 6/1954 |
| FR | 2790692 | A1 | * | 9/2000 |
| JP | 2002126922 | A | * | 5/2002 |
| JP | 2005138215 | A | * | 6/2005 |

OTHER PUBLICATIONS

English translation of the description of JP2005138215 A.*
English translation of the description of FR 2790692 A1.*

* cited by examiner

*Primary Examiner* — Daniel Howell
(74) *Attorney, Agent, or Firm* — Christensen O'Connor Johnson Kindness PLLC

(57) ABSTRACT

Tap and die devices are provided to repair internal and external threads, respectively. The tap and die devices are provided with components that coaxially align the tap and die to the nut or fitting being repaired. The tap and die devices are easily portable, compact tools that can be used in tight places.

9 Claims, 6 Drawing Sheets

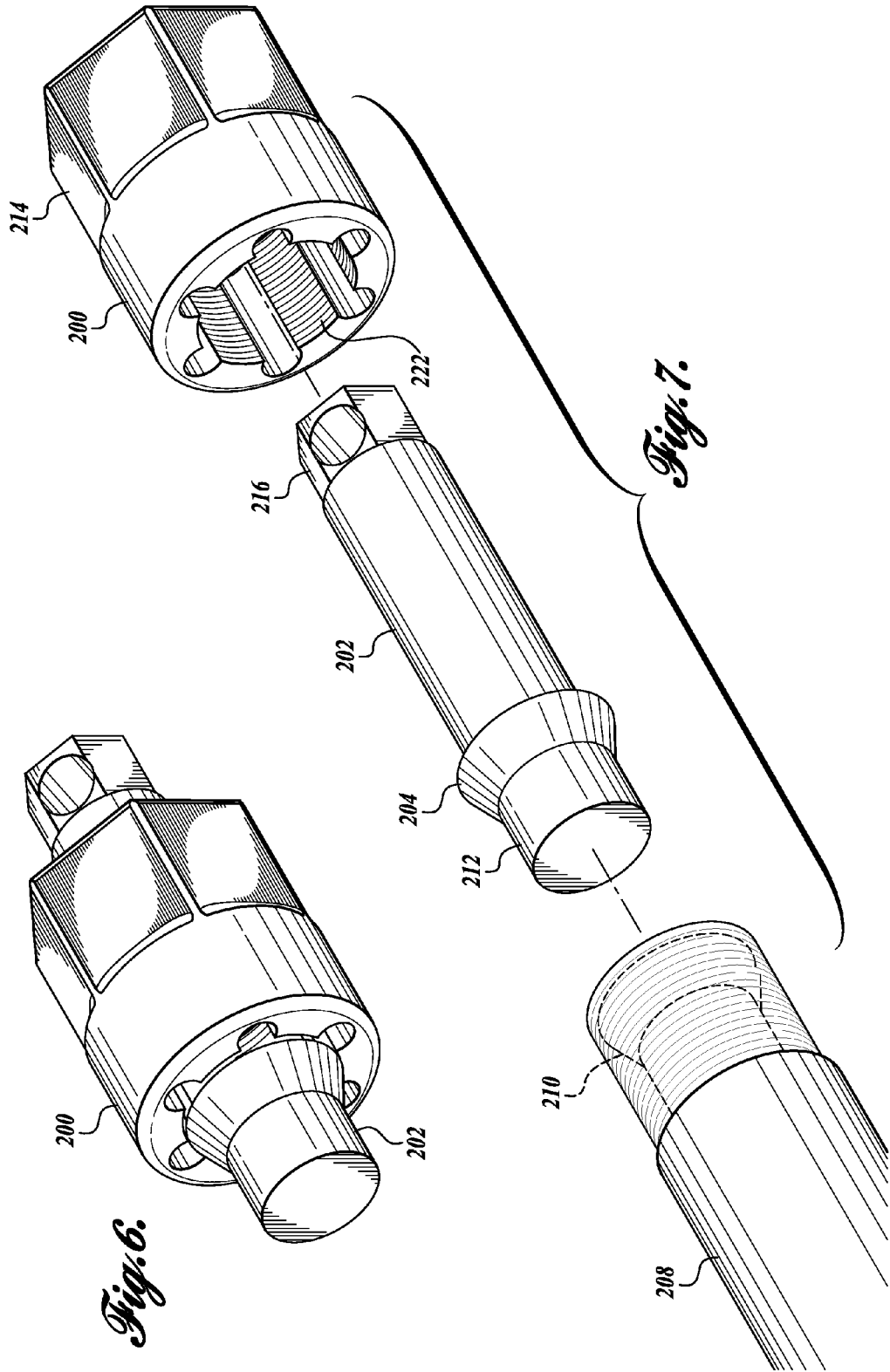

TAP AND DIE DEVICES

BACKGROUND

Many piping and plumbing process systems require that pipes, tubing, and fittings be attached by threaded fasteners. Screw threads on nuts or on fittings can be damaged in several ways. If the threads cannot be repaired, usually the nut, pipe, or tubing is discarded or has to be spliced. A problem with attempting to repair threads is the inability to maintain the tap or die coaxially aligned with the nut or fitting being repaired. If the repair is performed with the tap or die at an angle, the screw threads will be misaligned and fittings being joined may not function properly. Compression fittings are commonplace. In a compression system, a nut with a hole in the center through which a tube passes is used to connect the tube to a fitting. A ferrule, also with a hole in the center, is placed on the end of the tube and in front of the nut. When the nut is tightened against a fitting to connect the tube to the fitting, the ferrule can be compressed against tube material, thus deforming the tube and helping to create a seal. During the threading process, the threads on the nut or the fitting may be damaged due to an initial misalignment. A problem arises when repairing a captured nut on a tube because the tube renders the nut inaccessible.

Accordingly, it would be useful to provide a tap and die device that can repair external and internal screw threads to avoid having to discard or splice materials. It would further be advantageous to provide a tap and die device that can coaxially align a workpiece needing to be repaired with the tap or die. It would further be advantageous to repair a nut while captured on a tube.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a tap device includes an elongated tap including a shaft having external cutting threads on one end and a body having a bore on one end within which the shaft rotates and a socket on the opposite end of the bore, wherein the center of the socket is coaxially aligned with the longitudinal center of axis of the shaft.

The tap device of the first embodiment can be provided wherein the socket has a plurality of sides.

The tap device of the first embodiment can be provided wherein the shaft is hollow at least at the end having the cutting threads. This hollow or cavity allows the tap to reach the nut when the nut is captured on a tube because the tube and ferrule can fit within the cavity.

The tap device of the first embodiment can be provided wherein the shaft is hollow at least at the end having the cutting threads and the hollow end includes a frustoconical bevel. This allows the tap to reach the nut when the nut is captured on a tube because the tube and a ferrule can fit within the hollow cavity. A hollow end of the tap can be shaped to match any type of tube nut and ferrule.

The tap device of the first embodiment can be provided wherein the socket includes slots placed on opposite sides and a clip is placed within the slots.

The tap device of the first embodiment can be provided wherein the body has an exterior shape with a plurality of planar sides, such as a hexagonal shape. This allows the body to be held with a typical hand tool, such as a wrench, during the repair process.

The tap device of the first embodiment can be provided wherein the tap and body are approximately the same length. This provides a compact device and also allows the tap to reach at least to the slots made in the socket while the head still projects outward of the body to allow turning the tap.

In a second embodiment, a method for repairing internal threads includes placing a tap within a bore of a body having a socket located opposite from the bore, wherein the socket and bore are coaxially aligned. The method includes placing a nut within the socket and rotating the tap to engage cutting threads on the tap with threads on the nut to repair the threads.

The method of the second embodiment may further include securing the nut in the socket to prevent the nut from exiting the socket.

The method of the second embodiment may further include engaging tubing passing through the nut within a cavity provided on the end of the tap.

In a third embodiment, a die device includes a die including internal cutting threads on one end and a bore on the inside at an opposite end from the cutting threads, wherein the center of the bore is coaxially aligned with a center of a diameter of the cutting threads and a pilot including a shaft that fits within the bore, wherein the longitudinal center of axis of the pilot is coaxially aligned with the center of the diameter of the cutting threads.

The die device of the third embodiment can be provided wherein the die includes means for turning the die.

The die device of the third embodiment can be provided wherein the pilot includes a boss placed a predetermined distance from one end of the shaft. The boss shape can be made to match any specific fitting such that the boss is placed against the fitting to help with aligning the pilot to the fitting.

The die device of the third embodiment can be provided wherein the pilot includes a spindle in front of the boss. The spindle outer diameter can be made to match any specific fitting such that the spindle is placed inside of the fitting to help with aligning the pilot to the fitting.

The die device of the third embodiment can be provided wherein the outer diameter of the boss is smaller than a minor diameter of the cutting threads to allow the boss to fit within the die in the area of the cutting threads.

The die device of the third embodiment can be provided wherein the pilot includes a frustoconical boss on the shaft wherein, when placed within the die, a base of the frustoconical boss faces in the direction of the bore in the die.

The die device of the third embodiment can be provided wherein the axial length of the die is smaller than the length of the pilot.

In a fourth embodiment, a method for repairing external threads includes placing a pilot on the inside of a fitting with external threads wherein a portion of the pilot extends outward of the fitting, and the longitudinal center of the pilot is coaxially aligned with a center of a diameter of the external threads of the fitting. The method includes engaging a die with the outward extending portion of the pilot, wherein the longitudinal center of axis of the pilot is coaxially aligned with a center of a bore of the die. In this way, the longitudinal center of axis of the die is coaxially aligned with the center of a diameter of the external threads of the fitting. The method includes turning the die to advance the die on the threads of the fitting to repair the threads.

The method of the fourth embodiment may further include placing a boss on the pilot against a corresponding structure on the fitting to facilitate coaxial alignment of the pilot to the fitting.

Disclosed herein is a tap and die device having a component that assists with maintaining a workpiece, such as a nut or fitting, coaxially aligned with the tap and die device. In the tap device, the component is a body configured with a socket and bore to hold the workpiece and the tap both coaxially aligned with each other. The tap can be hollow at least at one end to accept a tube and ferrule in the situation when the nut is captured on a tube. In the die device, the component is a pilot that is configured to maintain the die coaxially aligned with the workpiece. The pilot fits within a fitting to maintain the alignment.

The tap and die devices can be provided together as a set or a kit. Furthermore, the tap and die devices can be sized to match any standard or nonstandard screw thread size for compression type tube and piping connections. A plurality of different sized tap and die devices can be combined into a kit.

The tap and die devices can repair internal and external threads, respectively. The tap and die devices are provided with a component that coaxially aligns the tap and die to the nut or fitting being repaired. The tap and die devices are easily portable, compact tools that can be used in tight places. The tap and die devices are manually operated and do not require the use of pneumatic nor electrically powered tools. Common manual tools can be used to operate the tap and die devices.

The tap and die devices can be used to repair pre-existing threads on nuts and other fittings that have been damaged. The tap and die devices can be used on materials used in threaded systems, including metal, iron, steel, copper, brass, plastic, and the like.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a diagrammatical illustration of a die device in accordance with one embodiment of the invention;

FIG. 7 is an exploded view diagrammatical illustration of the die device of FIG. 6.

DETAILED DESCRIPTION

Figure 1:
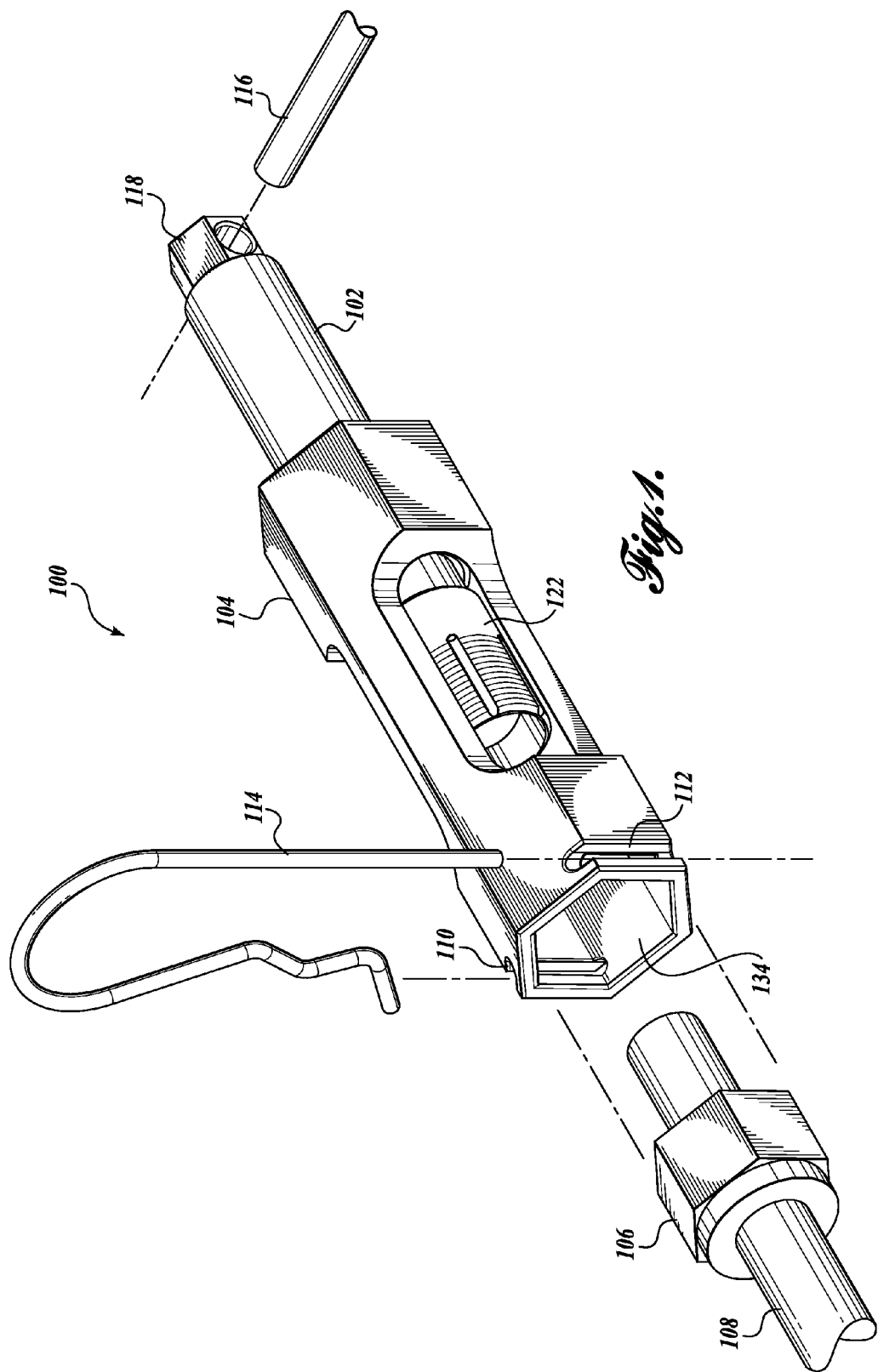
FIG. 1 is a diagrammatical illustration of a tap device in accordance with one embodiment of the invention.

Referring to FIG. 1, a tap device 100 is illustrated. The tap device 100 may be used to repair internal screw threads, such as are present in a nut 106. The nut 106 can be assembled on the tube 108 and captured by a ferrule (not shown). However, the tap device 100 is not limited to using only on captured nuts. The tap device 100 can be used on loose nuts. However, the repair of threads on never used, loose nuts is less common.

The tap device 100 includes a tap 102 and a body 104. The body 104 can be a structure with a hollow interior within which the tap 102 is located. One end of the body 104 is provided with a bore within which one end of the tap 102 rotates. The bore diameter can be closely matched to the diameter of the tap 102 to provide little or no side-to-side movement to maintain coaxial alignment between the tap 102 and the body 104. The tap 102 includes a shaft. At least the part of the shaft that fits within the bore is cylindrical to allow rotation therein. Because the bore within which the tap 102 fits is only slightly larger than the diameter of the cylindrical portion of the tap 102, the tap 102 has insignificant lateral movement. On the end of the body 104 opposite to the bore is a socket 134. Both the bore and socket have the same center of axis and are coaxially aligned with one another. The socket 134 and the bore are rigidly connected to each other. In one embodiment, the body 104 can be a unitary piece of material and the bore and socket are formed from the single piece of material. In other embodiments, the bore and socket can be separate but connected rigidly to one another such that the center axis of the bore and the center axis of the socket are coaxially aligned.

In one embodiment, the socket 134 can be hexagonal on the inside and outside. However, while a hexagonal socket is illustrated, it can be appreciated that the socket can be any size or shape and possess any number of sides. The socket 134 may be provided in the shape or size to match any standard nut size and shape as well as any custom or irregular shape. Furthermore, the socket may include curved shapes or a combination of curved and straight sides to match irregular, custom, or specialized nuts. The outside of the socket 134 may be shaped as a hexagon or otherwise to provide a way of holding the body 104 while repairing the threads. The body 104 may be held with a wrench, vise or other tool.

The body 104 has a centerline defined as a line passing longitudinally through the center of the body 104 as well as through the bore and socket. The tap 102 includes a centerline passing longitudinally through the center of the tap 102. The purpose of the bore is to keep the centerline of the tap 102 aligned as closely as possible to the centerline of the body 104. As a consequence, the centerline of the tap 102 is also coaxially aligned and passes through the centerline of the socket 134. The purpose for this will become apparent as further described below.

One application of the tap device 100 illustrated in FIG. 1 is for repairing threads that have been damaged or are otherwise in need of repair. The nut 106 includes internal or female threads, while a fitting may include external or male threads. The threads of the nut 106 are defined by a diameter and are centered with respect to the center bore of the nut 106. In one particular embodiment, the tap device 100 may be used to repair threads on a nut 106 as part of a tubing section 108. For example, nut 106 and tubing 108 can comprise parts of a compression fitting system, wherein the nut 106 is captured on tubing 108 by a ferrule (not shown). As is well known, compression fittings work by compressing a frustoconically shaped ferrule (not shown) on the tubing 108 against a fitting having a similar frustoconical shape on the inside of the fitting. Once the ferrule is placed on the frustoconically shaped fitting, the nut 106 is threaded onto the fitting (not shown) and tightened. The nut 106 can not be removed after tightening to a sealing condition because the ferrule is tightly pressed to the tubing 108 and usually deforms the tubing.

As discussed above, the socket 134 of the body 104 is configured to accept any standard or irregular nut, such as nut 106. The tolerances between the interior socket dimensions and the exterior nut dimensions are preferably kept as small as possible so that when placed in the socket 134, the nut 106 center is coaxially aligned as closely as possible with the center of the socket 134, which has the consequence that the nut 106 is also coaxially aligned with the tap 102 in the body 104. The body 104 maintains the tap 102 coaxially aligned on the center of the nut 106 to produce accurate, straight threads during repairs.

The socket 134 may have a first and second slot 110 and 112 on opposite sides of the socket 134. In use, the nut 106, with or without the tubing 108, may be placed inside the body 104 until the nut 106 extends deeper than the slots 110 and 112. At that point, a clip 114 may be inserted in slots 110 and 112 to retain the nut 106 from being pushed out of the socket 134. The tap 102 includes means to rotate the tap 102. Once the nut 106 is inside the socket 134, the tap 102 may be turned and advanced in the body 104 by using a rod 116 acting as a lever, or the tap 102 can be fitted with a hexagonal head 118 that may be turned with a standard wrench. The body 104 may be held with a wrench, vise, or other tool.

Figure 2:
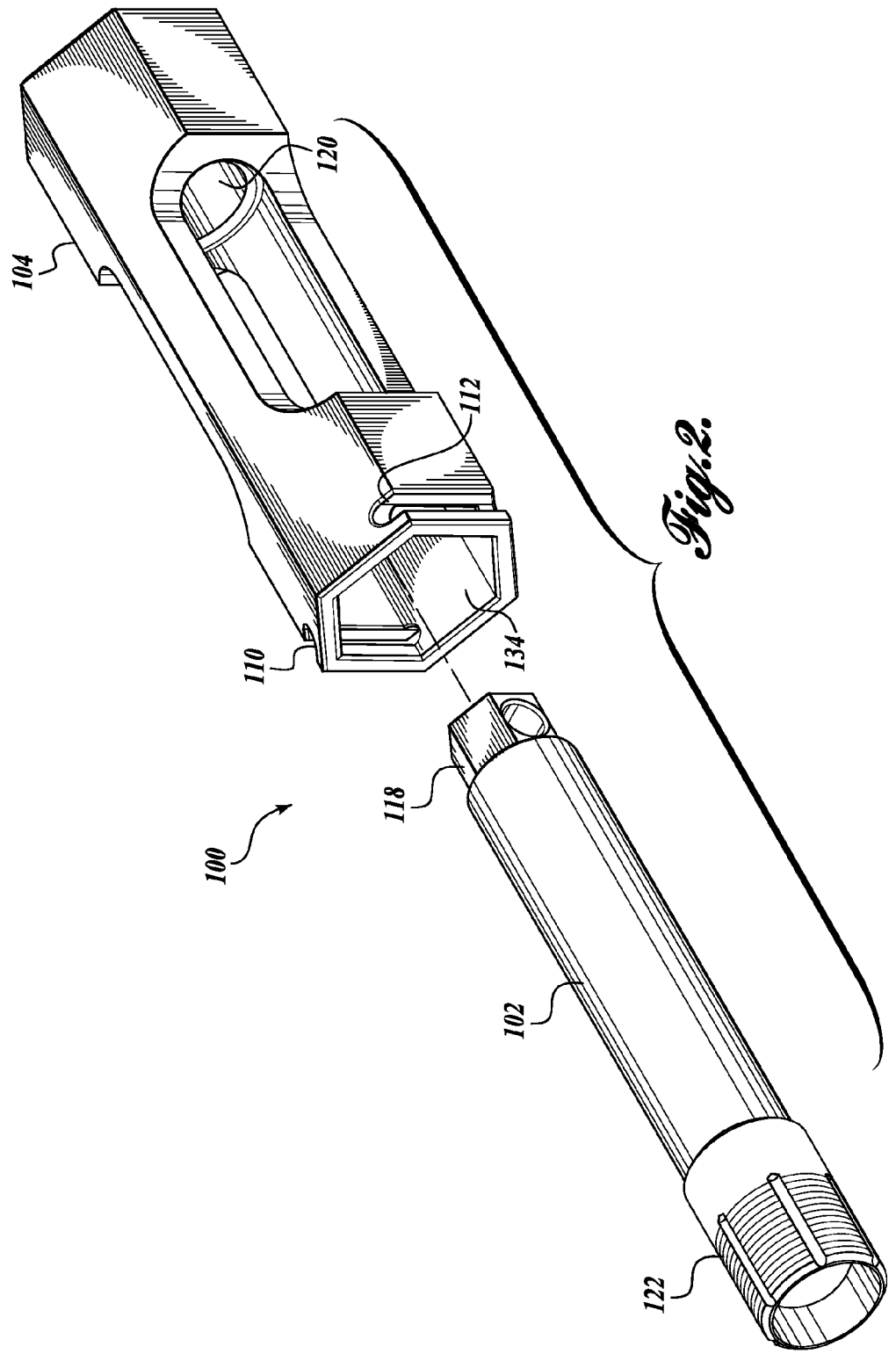
FIG. 2 is an exploded view diagrammatical illustration of the tap device of FIG. 1.
Figure 3:
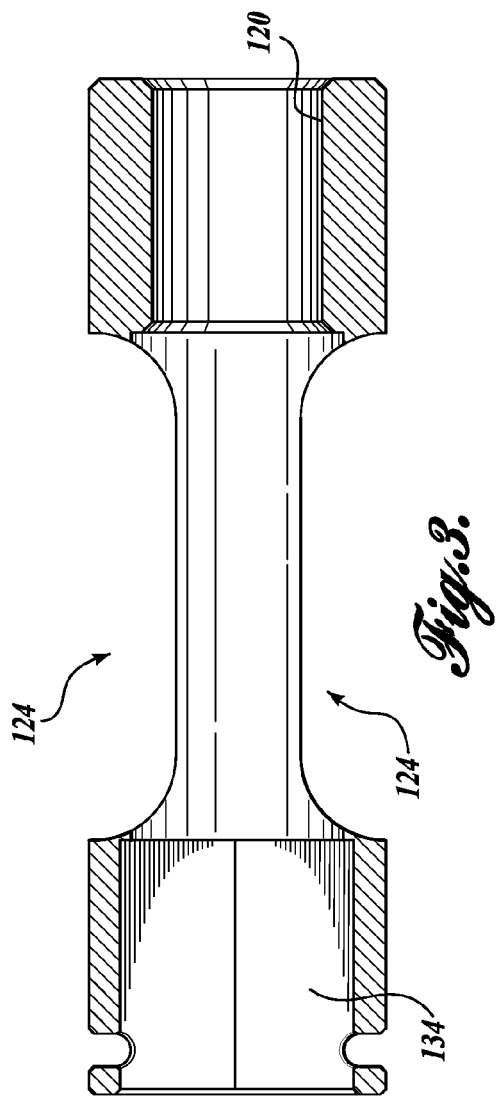
FIG. 3 is a cross-sectional illustration of a body of a tap device in accordance with one embodiment of the invention.
Figure 4:
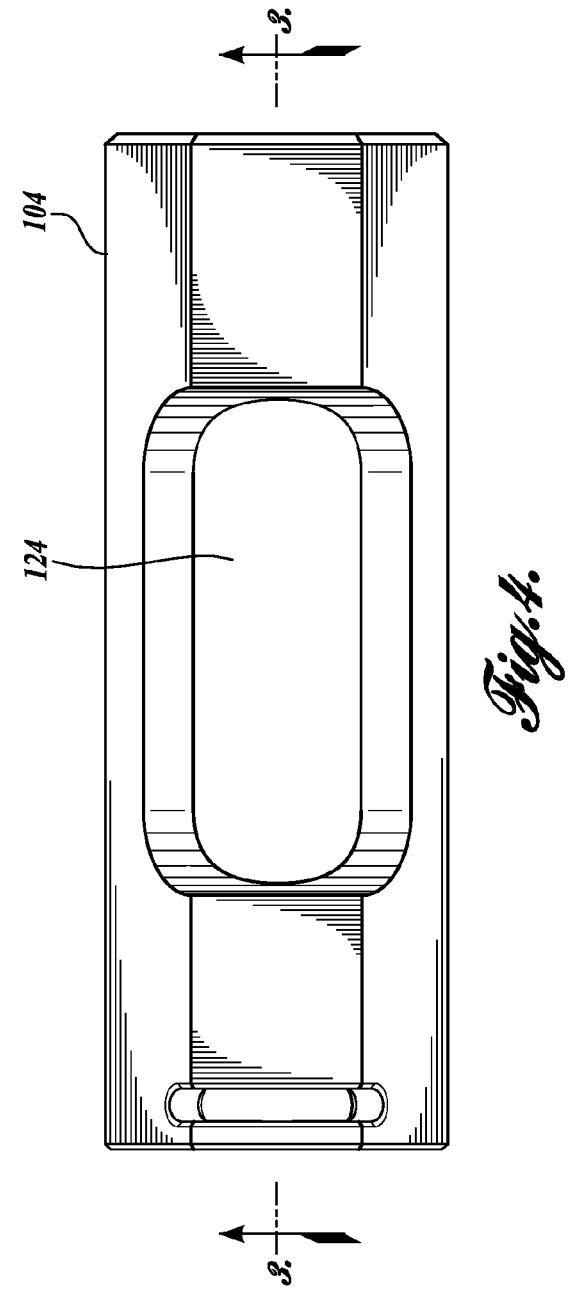
FIG. 4 is a diagrammatical illustration of a body of a tap device in accordance with one embodiment of the invention.

Referring to FIG. 2, the tap device 100 comprising the tap 102 and body 104 is illustrated. As can be seen clearly in FIG. 2, the body 104 has a cylindrical bore 120 for the bore 120. The bore 120 diameter is slightly larger than a diameter of the tap 102 to allow rotation therein with minimal lateral play. The centerline of the tap 102 is coaxially aligned with the centerline of the body 104 and, as a consequence, with the centerline of the socket 134. The tap 102 includes external cutting threads 122 on one end thereof. Cutting threads 122 may be of any design known in the art. For example, cutting threads 122 may be of a common type and include any number of flutes. As is well known, cutting threads 122 can be defined by a major, minor, and pitch diameter, and any numbers of flutes and lead angle. In one embodiment, the outside of the body 104 may have a hexagonal shape, providing six sides along the length of the body. However, the body 104 can be other shapes. For example, the outside of the body 104 may be cylindrical. However, the interior of the body 104 may have a hexagon shape (or any other shape) for the socket 134 and a cylindrical shape for the bore 120. In one embodiment, elongated openings 124 as seen in FIGS. 3 and 4 may be provided on the body 104 on one or two sides thereof. However, the openings 124 are optional. The openings 124 may be provided on opposite sides of the body 104 to allow viewing the process of chasing the threads. A hexagonally shaped body 104 provides the ability to hold the body 104 with a standard wrench, vise, or other tool at both ends of the body 104. However, the body 104 can have other shapes to assist with holding the body 104 when repairing threads.

Figure 5:
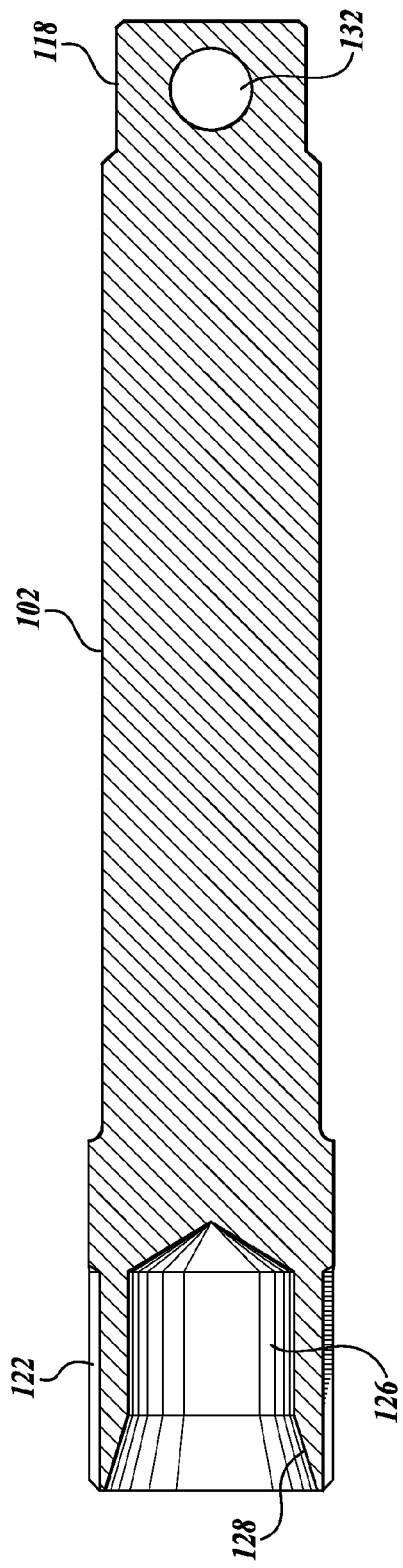
FIG. 5 is a diagrammatical cross-sectional illustration of a tap in accordance with one embodiment of the invention.

Referring to FIG. 5, a cross-sectional view of the tap 102 is shown. In one embodiment, the tap 102 is hollow at the end containing the cutting threads 122, thereby forming a cavity 126 at the end. The cavity 126 may have a shape and diameter to match a shape and diameter of any standard (or nonstandard) tubing size to allow the front end of the tubing to fit within the cavity 126. Since the nut is also centered on the tubing, the tubing may further provide additional support to maintain the nut coaxially aligned with the tap 102 as the tap 102 is advanced on the nut. The forward end of the cavity 126 includes a beveled or frustoconical shape 128, wherein the base of the frustoconical shape 128 is the forwardmost part. The frustoconical shape 128 can correspond to the shape of a ferrule, such as, for example, the ferrules that are used in well known compression fittings. Providing the cavity 126 and the frustoconical shape 128 at the end of the tap 102 allows the tap 102 to advance without hindrance to the bottom of the nut 106 when the nut 106 being repaired is connected to tubing. It should be appreciated that the shape of the cavity can be made to match any fitting, compression or otherwise. The frustoconical shape mentioned is to illustrate one embodiment of the tap 102.

The tap device 100 can be provided wherein the tap 102 and body 104 are approximately the same length. This provides a compact device and also allows the tap 102 to reach at least to the slots 110 and 112 made in the socket 134, while the head 118 still projects outward of the body 104 to allow turning.

On the end opposite to the cutting threads 122, the tap 102 includes a head 118. The head 118 projects outside of the body 104, as seen in FIG. 1, even when the tap 102 is advanced to the bottom of the socket 134. The head 118 may be shaped as a hexagon to allow the use of standard wrenches to rotate the tap 102. Alternatively, or additionally, the head 118 may also include a hole 132 to allow a rod 116 to be used as a lever to turn the tap 102. The tap 102 is manually driven by hand and does not require the use of powered tools.

Referring now to FIG. 6, a die device is illustrated for repairing external or male threads. The die device includes a die 200 and a pilot 202.

As shown in FIG. 7, the majority of the length of the pilot 202 can be cylindrical in shape. The pilot 202 includes a boss 204 that is rigidly affixed to a position along the length of the pilot 202. The boss 204 may be shaped to correspond to standard or irregular tubing and/or piping components. For example, the boss 204 can have a frustoconical shape similar to the ferrules used in compression fittings. In the illustrated embodiment, the frustoconical shaped boss 204 has a base that faces the die 200. In compression fittings, such as the one illustrated in FIG. 7, the end of fitting 208 is provided with a bore having a beveled edge 210 that is frustoconical in shape. The fitting 208 has external threads that can be repaired using the disclosed die device. The threads on the fitting 208 are defined by a diameter and are centered with respect to a bore within the fitting 208. The bore can terminate at the beveled frustoconical edge 210. The pilot 202 may include a spindle 212 in front of the boss 204. The spindle 212 may be sized to fit within the bore in fitting 208, and the boss 204 is sized to fit against the beveled edge 210 of the fitting 208. The outer dimension of the spindle 212 is matched closely to the inner diameter of the fitting 208. When the spindle 212 is inserted in the fitting 208 and the boss 204 is placed against the beveled edge 210, this will provide for coaxially aligning the center of the fitting 208 threads to the longitudinal centerline of the pilot 202. Fitting 208 may include components such as valves, for example.

The die 200 fits over the pilot 202 as seen in FIG. 6. The die 200 includes interior cutting threads 222 and an interior bore that is closely dimensioned to a diameter of the pilot 202. The purpose of the bore is to allow the centerline of the die 200 to remain coaxially aligned to the centerline of the pilot 202 with high precision as the die advances forward. Consequently, because the centerline of the pilot 202 is aligned with the centerline of the fitting 208, the centerline of the die 200 will also be aligned with the centerline of the fitting 208. Thus, the die 200 becomes coaxially aligned with the fitting 208 threads. Furthermore, as the die 200 is turned and advances, the pilot 202 assists in maintaining the die 200 straight to avoid cutting threads at an angle. The interior cutting threads 222 can be of a conventional or well-known design to repair exterior threads. The fitting 208 can be held with a standard wrench, in a vise, or is otherwise rigidly held during the repair of the fitting.

At the end opposite to the spindle 212, the pilot 202 is provided with a head 216. Optionally, the head 216 may be a hexagon shape and/or the head 216 may include a hole therein.

Figure 8:
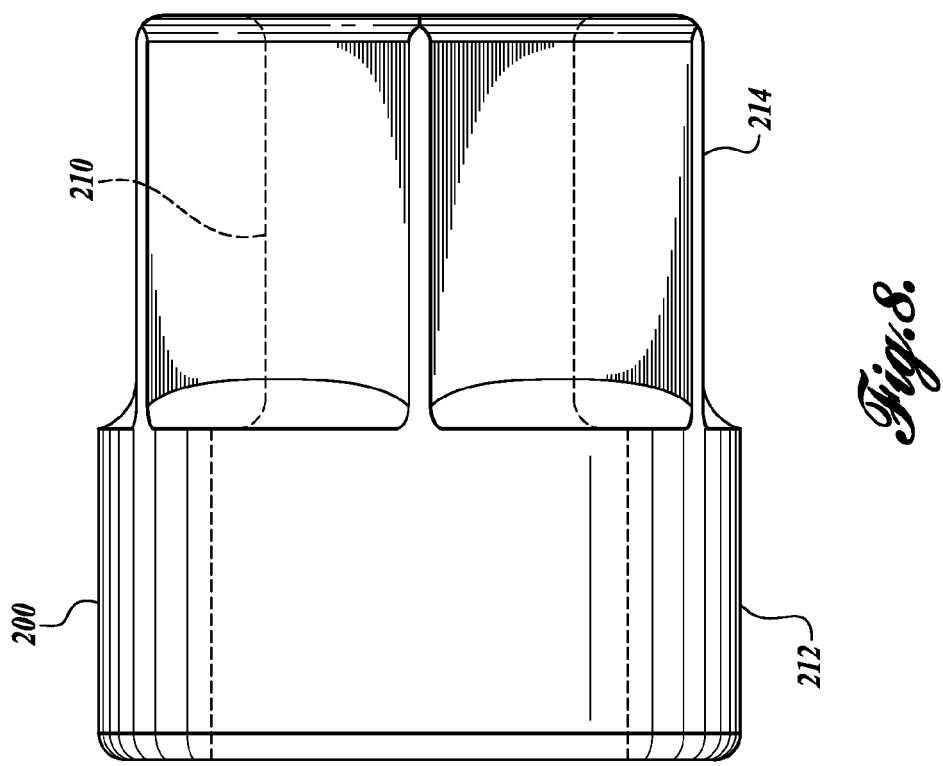
FIG. 8 is a diagrammatical illustration of a die in accordance with one embodiment of the invention.

Referring to FIG. 8, an illustration of the die 200 is shown. The die 200 is a hollow structure that may be formed from a single piece of material. The end 212 includes cutting threads 222 on the interior. As is well known, cutting threads 222 can be defined by a major, minor, and pitch diameter, and any number of flutes and lead angle. The end 214 includes a bore 210 on the interior and the exterior can be provided with means used to apply torque to turn the die 200. The center of the bore 210 is coaxially aligned with the center of the pitch diameter that defines the cutting threads 222. The die 200 fits over the pilot 202 such that the pilot 202 fits within the bore 210. The die 200 can advance on the pilot 202 up to the point when the base of boss 204 contacts the bore 210. A lip cap be formed where the diameter of the bore 210 expands to the diameter of the cutting threads 222. The diameter of the boss 204 is smaller than the diameter of the minor diameter of the cutting threads 222 to allow the boss 204 to fit within the area of the cutting threads 222. Furthermore, the length of the area of the cutting threads 222 is long enough so that the die will advance far enough to repair the length of the threads needing repair.

In one embodiment, the end 214 used to turn the die 200 may have a hexagon shape that fits standard wrench sizes. However, the end 214 can also be square or a polygon with any number of sides. The die 200 can be turned with a standard wrench, for example, by hand without powered tools. When turning the die 200, the fitting 208 can be held with a wrench, vise, or otherwise held rigidly.

While illustrative embodiments have been illustrated and described, it will be appreciated that various changes can be made therein without departing from the spirit and scope of the invention.

The invention claimed is:

1. A tap and body combination device, comprising:
   an elongated tap including a shaft having external cutting threads on one end, wherein the end of the shaft includes an axial opening configured to match a size of a standard tubing size to maintain the tubing coaxially aligned with the shaft;
   an elongated body being a unitary piece of material, the body comprising a first end portion having an axial bore within which the tap rotates and a second end portion having a hexagonal interior socket, wherein the center of the socket is coaxially aligned with the longitudinal center axis of the tap, wherein the body includes a hexagonal-shaped exterior around the periphery of the first end portion and the second end portion, wherein the first end portion with the socket and the second end portion with the bore are connected via a third and a fourth body portion, each of the third and fourth body portions connects opposite sides of the first end portion to the second end portion, and the third and fourth body portions are configured to leave a first and second elongated opening on each of two opposite sides of the body, and wherein a diameter of the bore is sized slightly larger than a diameter of the tap to engage with the shaft of the tap to minimize lateral play of the tap.

2. The tap device of claim 1, wherein the socket has a plurality of sides.

3. The tap device of claim 1, wherein the shaft is hollow at least at the end having the cutting threads.

4. The tap device of claim 1, wherein the shaft is hollow at least at the end having the cutting threads, and the hollow end includes a frustoconical bevel.

5. The tap device of claim 1, wherein the socket includes slots placed on opposite sides and a clip is placed within the slots.

6. The tap device of claim 1, wherein the tap and the body are approximately the same length.

7. A method for repairing internal thread chasing of a nut captured on tubing, comprising:
   placing a tap within a bore of a body having a socket located opposite from the bore, wherein the socket and tap are coaxially aligned;
   placing a nut within the socket, wherein the nut is captured on the tubing, and the nut has damaged threads; and
   rotating the tap to engage cutting threads on the tap to threads on the nut, wherein the end of the shaft includes an axial opening that contacts the tubing with a ferrule to maintain the nut coaxially aligned with the shaft, and
   producing from the damaged threads accurate, straight threads on the nut while the nut stays captured to the tubing.

8. The method of claim 7, further comprising securing the nut in the socket to prevent the nut from exiting the socket.

9. The method of claim 7, further comprising engaging tubing passing through the nut within a cavity provided on the end of the tap.

* * * * *